(12) United States Patent
Schneider et al.

(10) Patent No.: US 8,777,807 B2
(45) Date of Patent: Jul. 15, 2014

(54) METHOD OF RESOLVING A TOOTH-ON-TOOTH SITUATION

(75) Inventors: Florian Schneider, Lindenberg (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 551 days.

(21) Appl. No.: 13/183,734

(22) Filed: Jul. 15, 2011

(65) Prior Publication Data

US 2012/0055752 A1  Mar. 8, 2012

(30) Foreign Application Priority Data

Sep. 2, 2010 (DE) .......................... 10 2010 040 159

(51) Int. Cl.
*H02P 15/02* (2006.01)
*F16H 61/04* (2006.01)

(52) U.S. Cl.
CPC ...... *F16H 61/0403* (2013.01); *F16H 2061/047* (2013.01)
USPC .................................. 477/9; 477/71; 477/174

(58) Field of Classification Search
USPC .................. 477/7–9, 15, 70, 71, 79, 92, 166, 477/170–172, 174; 903/912, 930, 945–947
See application file for complete search history.

(56) References Cited

U.S. PATENT DOCUMENTS

| 3,667,309 | A | * | 6/1972 | Franz et al. | ..................... 74/340 |
| 5,389,053 | A | * | 2/1995 | Steeby et al. | ................. 477/123 |
| 8,475,332 | B2 | * | 7/2013 | Ishii et al. | ........................ 477/8 |
| 2008/0109143 | A1 | * | 5/2008 | Bartels et al. | ................... 701/67 |
| 2010/0041513 | A1 | | 2/2010 | Doebele et al. | |
| 2010/0044183 | A1 | * | 2/2010 | Guggolz et al. | .............. 192/219 |

FOREIGN PATENT DOCUMENTS

DE  10 2006 046 605 A1  4/2008
DE  10 2006 058 981 A1  6/2008

* cited by examiner

*Primary Examiner* — Justin Holmes
(74) *Attorney, Agent, or Firm* — Davis & Bujold, PLLC; Michael J. Bujold

(57) ABSTRACT

A method for releasing a tooth-on-tooth position of an interlocking shift element (6) of a transmission (5) or an interlocking shift element between two transmissions, such that the tooth-on-tooth position is released by using an actuator, in particular by using a transmission brake (8) or a drive clutch (7), and when a tooth-on-tooth position to be released is recognized, then depending on a drive-side or input-side rotational speed of the interlocking shift element (6), depending on a synchronous speed of the same and as a function of the actuators (3, 7, 8) available for releasing a tooth-on-tooth position, at least one actuator is selected, by using which the drive-side or input-side speed of the interlocking shift element (6) is approximated to its synchronous speed.

16 Claims, 2 Drawing Sheets

METHOD OF RESOLVING A TOOTH-ON-TOOTH SITUATION

This application claims priority from German patent application serial no. 10 2010 040 159.5 filed Sep. 2, 2010.

FIELD OF THE INVENTION

The invention concerns a method for releasing a tooth-on-tooth position.

BACKGROUND OF THE INVENTION

When carrying out a shift operation in a semi-automatic gearshift transmission in which an interlocking shift element is involved, and when carrying out a shift involving an interlocking shift element connected between two transmissions, tooth-on-tooth positions can occur which prevent engaging the interlocking shift element.

To carry out a shift operation with an interlocking shift element, tooth-on-tooth positions of this type have to be resolved. Appropriate actuators serve to release such tooth-on-tooth positions.

From DE 10 2006 046 605 A1 a method is known for releasing a tooth-on-tooth position of an interlocking shift element in a transmission; according to this prior art the tooth-on-tooth position can be released using a drive clutch or a transmission brake.

From DE 10 2006 058 981 A1 a method is known for releasing a tooth-on-tooth position of a shift element located between two transmissions; according to this prior art as well, with the help of an actuator an input shaft or a driveshaft of a downstream transmission can be rotated to release the tooth-on-tooth position.

To ensure the greatest possible shifting comfort, tooth-on-tooth positions have to be released as soon as possible in order to keep shifting times as short as possible. With the methods known from the prior art for releasing a tooth-on-tooth position, however, it can sometimes happen that a so-termed synchronous speed window for a drive-side or input-side rotational speed of the interlocking shift element concerned is departed from, and it then becomes necessary to interrupt the process of shifting and, first resynchronizing it anew before attempting it again. This results in long shifting times which have a negative influence on shifting comfort.

A method is therefore needed for releasing a tooth-on-tooth position at an interlocking shift element, with the help of which short shifting times and therefore a high level of shifting comfort can be ensured.

SUMMARY OF THE INVENTION

Starting from there, the present invention addresses the problem of providing a new type of method for releasing a tooth-on-tooth position.

According to the invention, when a tooth-on-tooth position to be released is recognized, then as a function of a drive-side or input-side speed of the interlocking shift element, as a function of a synchronous speed of the same and as a function of the actuators available in principle for releasing a tooth-on-tooth position, at least one actuator is selected and used such that the drive-side or input-side speed of the interlocking shift element can be approximated to its synchronous speed.

With the method according to the invention, its is proposed for the first time that when a tooth-on-tooth position to be released is recognized at an interlocking shift element, as a function of a drive-side or input-side speed of the interlocking shift element, as a function of a synchronous speed of the same and as a function of the actuators available in principle for releasing the tooth-on-tooth position, at least one actuator is selected, by using which the drive-side or input-side speed of the interlocking shift element can be approximated to its synchronous speed.

With the method according to the invention it can be ensured that an actuator for releasing a tooth-on-tooth position is always used, which adjusts the input-side or drive-side speed of the interlocking shift element in the correct direction, namely in the direction toward the synchronous speed. Accordingly, no predefined actuator is used for releasing a tooth-on-tooth position, but rather, the actuator which is the most suitable is selected from a number of available actuators for releasing the tooth-on-tooth position depending on the situation of the shift element at the time.

Preferably at least one actuator is selected, by using which the drive-side or input-side speed reaches the synchronous speed as quickly as possible and/or by using which the drive-side or input-side speed remains for as long as possible within a synchronous speed window defined around the synchronous speed. In this way the time needed for carrying out the shift can be further reduced.

In an advantageous further development of the invention, around the synchronous speed is defined, on the one hand, as a synchronous speed window with an upper synchronous speed window limit and a lower synchronous speed window limit and, on the other hand, a target speed window with an upper target speed window limit and a lower target speed window limit, such that the upper target speed window limit is or extends between the synchronous speed itself and the upper synchronous speed window limit and the lower target speed window is or extends between the synchronous speed and the lower synchronous speed window limit, and when the drive-side or input-side speed of the interlocking shift element is between the upper synchronous speed window limit and the upper target speed window limit, to release a tooth-on-tooth position an actuator is selected which reduces the drive-side or input-side speed, preferably as quickly as possible, to intersect the synchronous speed, whereas if the drive-side or input-side speed of the interlocking shift element is between the lower synchronous speed window limit and the lower target speed window, to release a tooth-on-tooth position an actuator is selected which increases the drive-side or input-side speed, preferably as quickly as possible, to intersect the synchronous speed, while if the drive-side or input-side speed of the interlocking shift element is between the upper and lower target speed window limits, then to release a tooth-on-tooth position a plurality of actuators are selected, preferably such that the drive-side or input-side speed remains for as long as possible within the synchronous speed window or, better still, the target speed window.

BRIEF DESCRIPTION OF THE DRAWINGS

Preferred further developments of the invention emerge from the description given below. An example embodiment of the invention, to which it is not limited, is explain in more detail with reference to the drawings, which show.

DETAILED DESCRIPTION OF THE PREFERRED EMBODIMENTS

The invention concerns a method for releasing a tooth-on-tooth position of an interlocking shift element, in particular a transmission-internal interlocking shift element of a semi-automatic gearshift transmission or an interlocking shift element connected between two transmissions.

Figure 1:
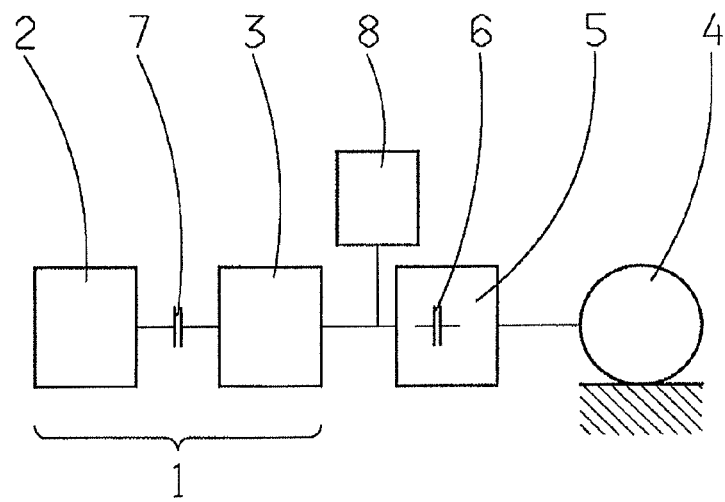
FIG. 1: A layout of a drive-train of a motor vehicle made as a hybrid vehicle, in which the method according to the invention can be used.

FIG. 1 shows as an example a drive-train in which the method according to the invention can be used. Thus, the drive-train of FIG. 1 has a drive aggregate 1 formed by an internal combustion engine 2 and an electric machine 3.

Between the drive aggregate 1 and a drive output 4 is connected a semi-automatic shift transmission 5 which comprises a plurality of interlocking shift elements 6. Between the internal combustion engine 2 and the electric machine 3 of the drive aggregate 1 is connected a drive clutch 7 which is open when the internal combustion engine 2 is disengaged from the drive output 4 and closed when the internal combustion engine 2 is engaged to the drive output 4. Such a drive-train is also called a parallel hybrid drive-train.

In addition, as shown in FIG. 1 the drive-train has a transmission brake 8 on the transmission input side.

Already at this stage it should be pointed out that the method according to the invention is not restricted in its use to a parallel hybrid drive-train of such type. Rather, the invention can also be used with other drive-trains whose transmissions include interlocking shift elements.

When a shift operation or gearshift is carried out in the semi-automatic gearshift transmission 5 of the drive-train in FIG. 1, with an interlocking shift element 6, a so-termed tooth-on-tooth position can occur, which has to be released. To ensure shorter shifting times and a high level of shifting comfort such tooth-on-tooth positions must be released in the shortest possible time.

In the context of the present invention it is proposed that when a tooth-on-tooth position to be released is recognized, depending on a drive-side or input-side rotational speed of the interlocking shift element 6 where the tooth-on-tooth position to be released has occurred, depending on a synchronous speed of this interlocking shift element 6 and depending on the actuators available in principle for releasing the tooth-on-tooth position, at least one actuator is selected, by using which the drive-side or input-side speed of the interlocking shift element 6 is approximated to its synchronous speed, and the actuator or each actuator selected is then used to release the tooth-on-tooth position. In the drive-train of FIG. 1 there are three actuators with the help of which a tooth-on-tooth position can be released by adapting the drive-side or input-side speed of an interlocking shift element 6 of the semi-automatic shift transmission 5, these being the starting clutch 7, the electric machine 3 of the drive aggregate 1 and the transmission brake 8.

Preferably, depending on the drive-side or input-side speed of the shift element 6 affected by the tooth-on-tooth position to be released, depending on its synchronous speed and depending on the actuators available in principle, that actuator is selected and used such that the drive-side or input-side speed of the shift element 6 is brought to intersect its synchronous speed, and this as quickly as possible.

Furthermore, preferably the actuator that is selected such that by its use, the drive-side or input-side speed of the shift element 6 remains for as long as possible within a synchronous speed window defined around the synchronous speed.

Figure 2:
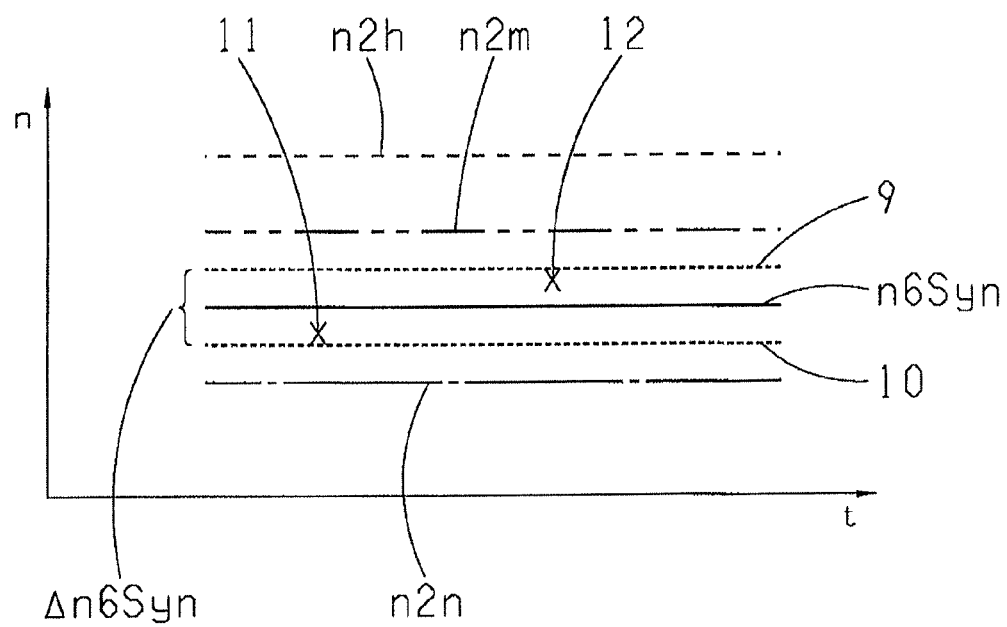
FIG. 2: A diagram to clarify the method according to the invention.

FIG. 2 shows a diagram in which a number of speeds n are plotted against time t, namely on the one hand a synchronous speed n6Syn which corresponds to the synchronous speed of a shift element 6, a synchronous speed window Δn6Syn around the synchronous speed n6Syn, which is defined by an upper synchronous speed window limit 9 and a lower synchronous speed window limit 10, and several possible speeds n2 of the internal combustion engine 2, namely a relatively low speed n2n, a relatively high speed n2h and a medium speed n2m of the internal combustion engine 2. The synchronous speed n6Syn for a shift element 6 is obtained by multiplying the output speed of the drive-train by the gear ratio of the target gear to be engaged. In addition, FIG. 2 visualizes as examples two tooth-on-tooth positions 11 and 12 which occur at the interlocking shift element 6, such that the tooth-on-tooth position 11 occurs at an input-side or drive-side speed of the interlocking shift element 6 which is lower than the synchronous speed n6Syn, whereas the tooth-on-tooth position 12 at the shift element 6 occurs at an input-side or drive-side speed higher than the synchronous speed n6Syn.

If such a tooth-on-tooth position 11 or 12 is detected at an interlocking shift element 6, then with knowledge of the drive-side or input-side rotational speed of the interlocking shift element 6, depending on the synchronous speed n6Syn thereof and also depending on the actuators available in principle for releasing the tooth-on-tooth position 11 or 12, at least one actuator can be selected, by using which the drive-side or input-side speed of the interlocking shift element 6 can be approximated to its synchronous speed n6Syn, namely in such manner that the drive-side or input-side speed intersects the synchronous speed n6Syn as soon as possible, and/or by using which the drive-side or input-side speed remains within the synchronous speed window Δn6Syn for as long as possible.

For the tooth-on-tooth position 11 in FIG. 2 this means that to release the same, at least one actuator is selected with whose help the drive-side or input-side speed of the interlocking shift element 6 can be raised or increased, thus being achieved in FIG. 2 for example by the drive clutch 7 if, for example, the internal combustion engine 2 is running at a medium speed n2m or at a relatively high speed n2h. In contrast, if the internal combustion engine 2 is running at a relatively low speed n2n, closing the drive clutch 7 cannot adjust the drive-side or input-side speed of the interlocking shift element 6 in the direction toward its synchronous speed n6Syn; rather, in the example embodiment of FIG. 2 this can be done exclusively by the electric machine 3.

On the other hand if the tooth-on-tooth position 12 exists, then at least one actuator is selected and used to release it, with whose help the drive-side or input-side speed of the interlocking shift element 6 can be reduced in the direction toward the synchronous speed n6Syn, and for this purpose at least the transmission brake 8 is available.

If the internal combustion engine 2 is for example running at a relatively low speed n2n, the drive clutch 7 can also be closed for the same purpose. Likewise, the same speed adaptation can be carried out by operating the electric machine 3 as a generator, and therefore in a braking mode.

As already explained, out of the actuators available preferably that one is selected with the help of which it can be ensured that the drive-side or input-side speed of the shift element 6 with the tooth-on-tooth position to be released intersects its synchronous speed n6Syn as soon as possible, and this in such manner that, further, the said speed remains within the synchronous speed window Δn6Syn for as long as possible.

Figure 3:
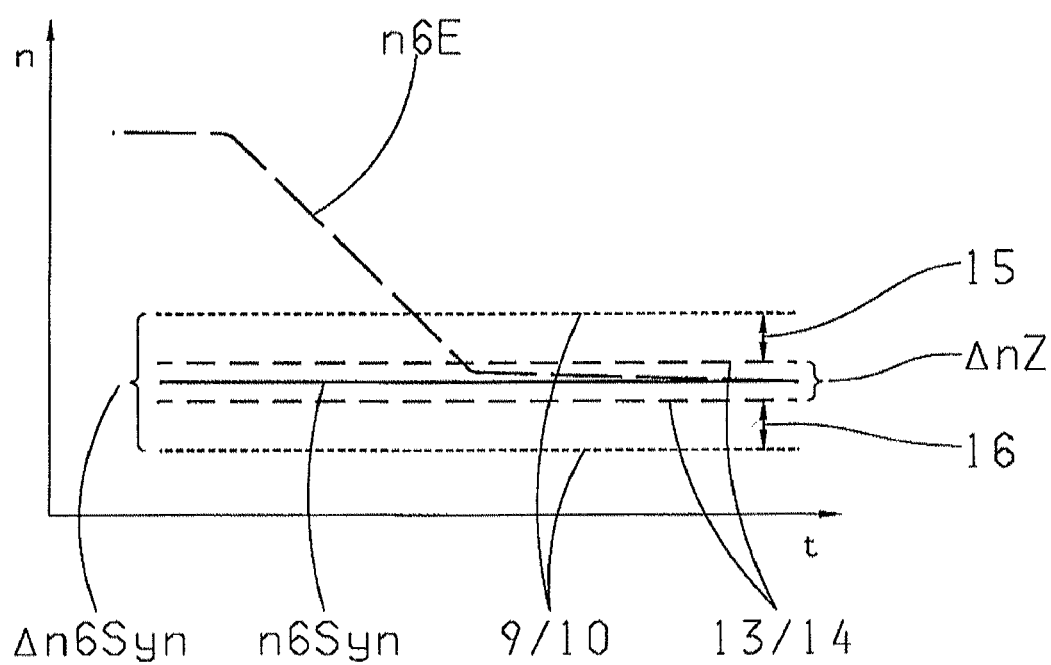
FIG. 3: Another diagram for the further clarification of the method according to the invention.

Other advantageous details of the method according to the invention emerge from the diagram of FIG. 3; in FIG. 3 too a number of speeds n are plotted against time, namely in addition to the already mentioned synchronous speed n6Syn and the already mentioned synchronous speed window Δn6Syn, an input-side or drive-side speed n6E of an interlocking shift element 6 and a target speed window ΔnZ defined by an upper target speed window limit 13 and a lower target speed window 14.

As shown in FIG. 3 the target speed window ΔnZ and the synchronous speed window Δn6Syn bracket the synchronous speed n6Syn itself, in such manner that the upper target speed window limit 13 is between the synchronous speed n6Syn and the upper synchronous speed window limit 9, and the lower target speed window limit 14 is between the synchronous speed n6Syn and the lower synchronous speed window limit 10.

An advantageous further development of the invention provides that if the drive-side or input-side rotation speed n6E of the shift element 6 with the tooth-on-tooth position to be released is between the upper synchronous speed window limit 9 and the upper target speed window limit 13, i.e. in the area 15 in FIG. 3, then to release the tooth-on-tooth position an actuator is selected which reduces the drive-side or input-side speed n6E, namely so that it intersects the synchronous speed n6Syn as soon as possible.

In contrast, if in the variant of FIG. 3 the drive-side or input-side speed n6E of the shift element 6 with the tooth-on-tooth position to be released is in the area 16 of FIG. 3, i.e. between the lower synchronous speed window limit 10 and the lower target speed window limit 14, then to release the tooth-on-tooth position, an actuator is selected which increases the drive-side or input-side speed, namely so that again it intersects the synchronous speed n6Syn as soon as possible.

In the areas 15 and 16, preferably exclusively one respective actuator is selected and activated for the release of the tooth-on-tooth position.

In the variant of FIG. 3, if the input-side speed n6E of the shift element 6 with the tooth-on-tooth position to be released is within the target speed window ΔnZ, i.e. between the upper target speed window limit 13 and the lower target speed window limit 14, then to release the tooth-on-tooth position a plurality of actuators are selected, prepared for activation and preferably actuated one after another in such manner that the drive-side or input-side speed n6E remains within the synchronous speed window Δn6Syn for as long as possible, and preferably within the target speed window ΔnZ for as long as possible. In this case the sequence in which the selected actuators are activated is also set or determined.

If the drive-side or input-side speed n6E of the shift element 6 with the tooth-on-tooth position to be released is either higher than the upper synchronous speed window limit 9 or lower than the lower synchronous speed window limit 10, the shift operation is interrupted and no release of the tooth-on-tooth position takes place by selecting and activating at least one of the actuators in the manner described above.

As already explained, the actuator or each actuator for releasing a tooth-on-tooth position is or are selected depending on of the drive-side or input-side rotational speed of the corresponding interlocking shift element 6, depending on its synchronous speed, as a function of the speed of a drive aggregate or part thereof, namely in FIG. 1 depending on the speed of the internal combustion engine 2, and also depending on component characteristics of the actuators available in principle, namely in FIG. 1 depending on component characteristics of the drive clutch 7, the electric machine 3 and the transmission brake 8. The component characteristics are, in particular, the dynamics that can be achieved by the actuators in relation to influencing the drive-side or input-side speed of the shift element 6 with the tooth-on-tooth position, and the related limits of that influence.

According to the invention it is therefore proposed, already before the release of a tooth-on-tooth position at a shift element 6, to assess which of the actuators, available in principle, is the most suitable. Then that actuator is selected, which influences the input-side or drive-side speed of the corresponding shift element in such manner that the speed intersects the synchronous speed and remains within a speed window for as long as possible.

In the context of the invention exclusively a single actuator can be selected, or alternatively it is possible to select a plurality of actuators for releasing a tooth-on-tooth position and in particular activate them one after another, for example if it is detected that when a first actuator is used, after reaching the synchronous speed, the input-side or drive-side speed overshoots the synchronous speed by too great an amount, by deactivating the previously activated actuator and activating an already prepared but not yet activated actuator, the drive-side or input-side speed of the shift element is brought back again in the direction toward its synchronous speed. By selecting and preparing a plurality of actuators, dead times in the operation of the actuators can be avoided.

INDEXES

1 Drive aggregate
2 Internal combustion engine
3 Electric machine
4 Drive output
5 Transmission
6 Shift element
7 Drive clutch
8 Transmission brake
9 Upper synchronous speed window limit
10 Lower synchronous speed window limit
11 Tooth-on-tooth position
12 Tooth-on-tooth position
13 Upper target speed window limit
14 Lower target speed window limit
15 Area
16 Area

The invention claimed is:

1. A method of releasing a tooth-on-tooth position of either an interlocking shift element of a transmission or an interlocking shift element connected between two transmissions, the tooth-on-tooth position being released using one of a transmission brake, a drive clutch and an electric machine, the method comprising the steps of:

upon recognizing when a tooth-on-tooth position to be released, comparing one of a drive-side and an input-side rotation speed of the interlocking shift element to a synchronous speed of the interlocking shift element, selecting at least one actuator from the transmission brake, the drive clutch and the electric machine, depending on the comparison of the one of the drive-side and the input-side rotation speed of the interlocking shift element to the synchronous speed of the interlocking shift element and depending on actuators available for releasing the tooth-on-tooth position, and using the selected at least one actuator to change the one of the drive-side or the input-side speed of the interlocking shift element to substantially match the synchronous speed of the interlocking shift element.

2. The method according to claim 1, further comprising the step of using the at least one actuator to vary the one of drive side speed and the input side speed to intersect the synchronous speed.

3. The method according to claim 2, further comprising the step of using the at least one actuator to vary the one of drive side speed and the input side speed is changed in a manner to intersect the synchronous speed, as soon as possible.

4. The method according to claim 1, further comprising the step of using the at least one actuator to vary the one of drive side speed and the input side speed remains within a synchronous speed window defined about the synchronous speed.

5. The method according to claim 1, further comprising the step of selecting the at least one actuator for releasing the tooth-on-tooth position, and when a plurality of actuators are selected, selecting an activation sequence thereof depending on the drive-side speed of the shift element, depending on its synchronous speed, depending on a drive aggregate speed and depending on component characteristics of the actuators available in principle.

6. The method according to claim 1, further comprising the step of selecting the at least one of the transmission brake, the drive clutch and the electric machine actuator to release the tooth-on-tooth position depending on whether the rotational speed of the drive-input of the interlocking shift element is greater than or less than the synchronous speed of the interlocking shift element.

7. A method of releasing a tooth-on-tooth position of either an interlocking shift element of a transmission or an interlocking shift element connected between two transmissions, the tooth-on-tooth position being released using one of a transmission brake and a drive clutch, the method comprising the steps of:
selecting at least one actuator, upon recognizing when a tooth-on-tooth position to be released, depending on one of a drive-side and an input-side rotation speed of the interlocking shift element, depending on a synchronous speed of the interlocking shift element and depending on actuators available for releasing the tooth-on-tooth position,
using the selected at least one actuator to approximate the one of the drive-side or the input-side speed of the interlocking shift element to the synchronous speed of the interlocking shift element,
selecting the at least one actuator by using a speed of one of the drive-side and the input-side which remains within a synchronous speed window defined about the synchronous speed,
defining the synchronous speed window as a synchronous speed window with an upper synchronous speed window limit and a lower synchronous speed window limit, and defining a target speed window with the upper target speed window limit and the lower target speed window limit such that the upper target speed window limit is between the synchronous speed and the upper synchronous speed window limit and the lower target speed window limit is between the synchronous speed and the lower synchronous speed window limit,
when the one of the drive-side and the input-side speed of the interlocking shift element is between the upper synchronous speed window limit and the upper target speed window limit, in order to release the tooth-on-tooth position, the actuator is selected which reduces the one of the drive-side and the input-side speed,
when the one of the drive-side and the input-side speed is between the lower synchronous speed window limit and the lower target speed window limit, in order to release the tooth-on-tooth position, the actuator is selected which increases the one of the drive-side and the input-side speed, and
when the one of the drive-side and the input-side speed of the interlocking shift element is between the upper and the lower target speed window limits, in order to release the tooth-on-tooth position, a plurality of actuators are selected.

8. The method according to claim 7, further comprising the step of, when the one of the drive-side and the input-side speed of the interlocking shift element is between the upper synchronous speed window limit and the upper target speed window limit, selecting and activating the actuator which reduces the one of the drive-side and the input-side speed so that the speed intersects the synchronous speed so as to release the tooth-on-tooth position as soon as possible.

9. The method according to claim 7, further comprising the step of, when the one of the drive-side and the input-side speed of the interlocking shift element is between the lower synchronous speed window limit and the lower target speed window limit, selecting and activating the actuator which increases one of the drive-side and input-side speed so that the speed intersects the synchronous speed to release the tooth-on-tooth position as soon as possible.

10. The method according to claim 7, further comprising the step of selecting and preparing a plurality of actuators for activation to release the tooth-on-tooth position when the one of the drive-side and the input-side speed of the interlocking shift element is between the upper target speed window limit and the lower target speed window limit, and
activating one actuator after another actuator in a sequence determined such that the one of the drive-side and the input-side speed remains within both the synchronous speed window and the target speed window for as long a duration of time as possible.

11. The method according to claim 7, further comprising the step of interrupting the shift operation if the one of the drive-side and the input-side speed of the interlocking shift element is greater than the upper synchronous speed window limit and lower than the lower synchronous speed window limit.

12. The method according to claim 7, further comprising the step of selecting the at least one actuator for releasing the tooth-on-tooth position, and when a plurality of actuators are selected, selecting an activation sequence thereof selected depending on the drive-side speed of the shift element, depending on its synchronous speed, depending on a drive aggregate speed and depending on component characteristics of the actuators available in principle.

13. The method according to claim 7, further comprising the step of selecting the at least one of the transmission brake, the drive clutch and an electric machine actuator to release the tooth-on-tooth position.

14. The method according to claim 7, further comprising the step of selecting the at least one actuator by using a speed of one of the drive-side and the input-side which intersects the synchronous speed.

15. The method according to claim 14, further comprising the step of selecting the at least one actuator by using a speed of one of the drive-side and the input-side which intersects the synchronous speed as soon as possible.

16. A method of for compensating for tooth-on-tooth engagement of an interlocking shift element of a transmission with an actuator, the method comprising the steps of:
recognizing the tooth-on-tooth engagement of the interlocking shift element of the transmission;

selecting the actuator from one of a plurality of transmission brakes, a plurality of drive clutches and an electric machine actuator depending on whether a rotational speed of a drive-input of the interlocking shift element is greater than or less a than a synchronous speed of the interlocking shift element and depending on which a of the plurality of transmission brakes, the plurality of drive clutches and the electric machine actuator is available for compensating for the tooth-on-tooth engagement of the interlocking shift element of the transmission; and adjusting the rotational speed of the drive-input of the interlocking shift element with the selected actuator to approximate the synchronous speed of the interlocking shift element.

* * * * *